United States Patent
Hariharasubramanian et al.

(10) Patent No.: US 12,277,492 B2
(45) Date of Patent: Apr. 15, 2025

(54) KERNEL-LEVEL LOAD BALANCING ACROSS NEURAL ENGINES

(71) Applicant: Apple Inc., Cupertino, CA (US)

(72) Inventors: Sundararaman Hariharasubramanian, San Jose, CA (US); Xiaozhong Yao, Cupertino, CA (US); Andrew Yanowitz, Ben Lomand, CA (US)

(73) Assignee: Apple Inc., Cupertino, CA (US)

(*) Notice: Subject to any disclaimer, the term of this patent is extended or adjusted under 35 U.S.C. 154(b) by 849 days.

(21) Appl. No.: 17/505,412

(22) Filed: Oct. 19, 2021

(65) Prior Publication Data

US 2022/0391677 A1 Dec. 8, 2022

Related U.S. Application Data

(60) Provisional application No. 63/197,441, filed on Jun. 6, 2021.

(51) Int. Cl.
| | |
|---|---|
| *G06N 3/063* | (2023.01) |
| *G06F 9/50* | (2006.01) |
| *G06F 9/54* | (2006.01) |
| *G06N 3/04* | (2023.01) |
| *G06N 3/06* | (2006.01) |
| *G06N 5/04* | (2023.01) |

(52) U.S. Cl.
CPC ........... *G06N 3/063* (2013.01); *G06F 9/5083* (2013.01); *G06F 9/545* (2013.01); *G06N 5/04* (2013.01); *G06F 9/5016* (2013.01); *G06N 3/04* (2013.01); *G06N 3/06* (2013.01)

(58) Field of Classification Search
CPC ........... G06N 3/063; G06N 3/06; G06N 3/04; G06N 5/04; G06F 9/5083; G06F 9/5016; G06F 9/545
See application file for complete search history.

(56) References Cited

U.S. PATENT DOCUMENTS

| | | | |
|---|---|---|---|
| 11,720,351 B2 * | 8/2023 | Jakubiuk | G06N 3/04 712/214 |
| 11,868,440 B1 * | 1/2024 | Patel | G06F 17/18 |
| 2022/0292303 A1 * | 9/2022 | Cao | G06F 9/505 |
| 2022/0382601 A1 * | 12/2022 | Feldman | G06F 9/5083 |

* cited by examiner

*Primary Examiner* — Andrew L Tank

(74) *Attorney, Agent, or Firm* — Kilpatrick Townsend & Stockton LLP

(57) ABSTRACT

An electronic device may receive, at a first system routine from a client application, a provisioning request indicating that the application includes code for evaluating a machine learning model, wherein the first system routine executes in user space of memory on the device. The device may provision the code for execution on one or more of the circuit engines. The device may receive, at a second system routine from the application, an inference request for evaluating the machine learning model containing input data, wherein the second system routine executes in kernel space of memory on the device. The device may receive, at the second system routine, information about the circuit engines. The device may assign the inference request to one or more of the circuit engines where the request is evaluated. The device may provide a result of the inference request to the application.

20 Claims, 7 Drawing Sheets

KERNEL-LEVEL LOAD BALANCING ACROSS NEURAL ENGINES

CROSS-REFERENCES TO RELATED APPLICATIONS

This application claims priority under 35 U.S.C. § 119(e) to U.S. Provisional Application No. 63/197,441, filed on Jun. 6, 2021 entitle, "KERNEL-LEVEL LOAD BALANCING ACROSS NEURAL ENGINES," the contents of which are herein incorporated by reference.

BACKGROUND

Computer chips can include multiple circuit engines of dedicated circuitry to perform specific, dedicated tasks. However, it can be difficult for an application developer to write code to take advantage of the multiple circuit engines. Also, it can be difficult to efficiently utilize such circuit engines.

BRIEF SUMMARY

Techniques are provided for kernel level load balancing of application requests to process neural networks on a neural engine. Other types of circuit engines can be dedicated to implement other types of machine learning models. A load balancer in the kernel can assign inference requests from application(s) to one or more circuit engines. Various logic and data can be used to determine how inference requests to evaluate a machine learning model are to be assigned.

In one embodiment, an electronic device comprising circuit engines can be configured to evaluate a particular type of machine learning model. A first system routine can receive, from a first client application, a provisioning request indicating that the first client application includes first code for evaluating the particular type of machine learning model. The first system routine can execute in user space of memory on the electronic device. The first code can be provisioned (e.g., preliminary steps) for execution on one or more of the circuit engines. A second system routine can receive, from the first client application, an inference request for evaluating the particular type of machine learning model. The inference request can include first input data upon which the particular type of machine learning model is evaluated. The second system routine can execute in kernel space of memory on the electronic device. The second system routine can receive information about a current status and historical performance of the circuit engines. The second system routine can assign the inference request to one or more of the circuit engines. The one or more of the circuit engines can then evaluate the inference request. A result of the inference request can then be provided to the first client application.

These and other embodiments of the disclosure are described in detail below. For example, other embodiments are directed to systems, devices, and computer readable media associated with methods described herein.

A better understanding of the nature and advantages of embodiments of the present disclosure may be gained with reference to the following detailed description and the accompanying drawings.

DETAILED DESCRIPTION

Figure 1A:
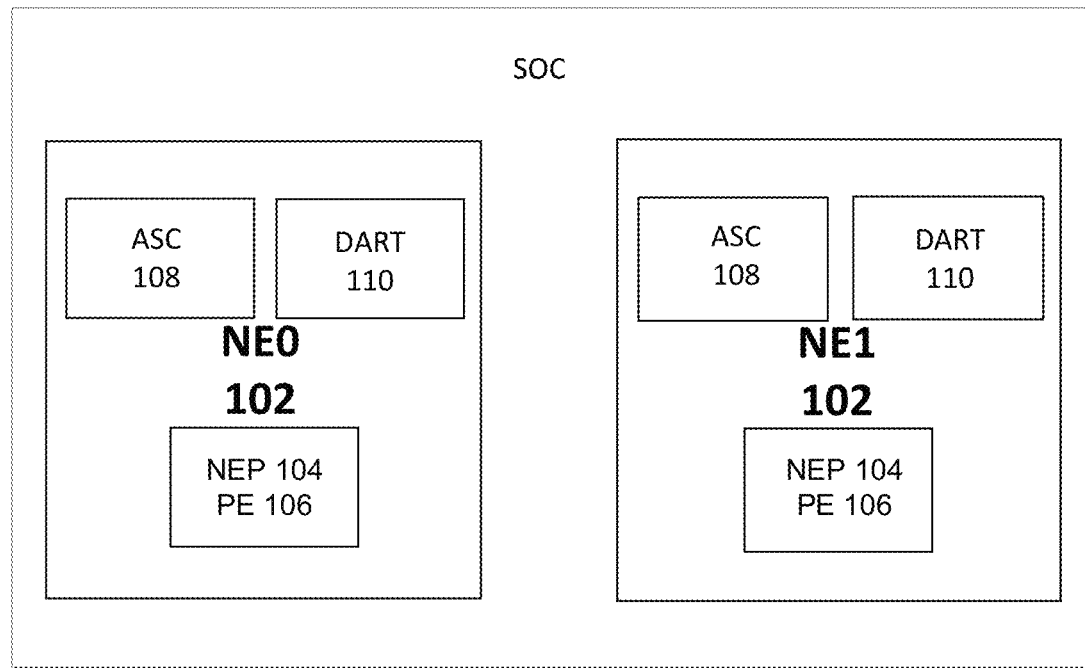
FIG. 1A illustrates an example system on a chip (SoC) with two neural engines (NEs) according to embodiments of the present disclosure.

Machine learning (ML) applications can be computationally demanding and generic computer processors are not optimized for ML calculations. The issues caused by computational complexity are often pronounced for personal electronics such as mobile devices or personal computers. A traditional approach to handling ML calculations has been to dispatch data to remote servers for processing. However, in addition to technical issues with a remote approach (e.g., network latency), consumers are reluctant to send personal data over the internet as ML applications often utilize personal photos, biometric data, and other sensitive information. Consumers may be reluctant to use software that sends personal data over the internet.

A circuit engine (e.g., a neural engine, NE) is a processor that is specialized for ML operations, and a circuit engine can allow efficient local ML calculations. Privacy conscious consumers may prefer local ML calculations because the customer may not want to share personal information with the application ("app") provider, or the customer may be concerned that unauthorized parties may access their personal data on the app provider's servers. Additionally, local ML calculations can offer consumers increased performance because network latency will not delay results.

New generations of computer chips can include multiple circuit engines (e.g., neural network (NE) engines). An NE is specifically optimized to perform the multiplications and other operations needed to evaluate a neural network. Although examples herein are provided for an NE, other circuit engines for other types of ML models can be used, e.g., circuit engines designed for decision trees, regression, support vector machines, clustering, etc.

However, it can be difficult for an app developer to write their code to take advantage of the multiple neural engines (NEs). Also, it can be difficult to most efficiently utilize the NEs. While the NE may allow for efficient ML calculations, balancing loads across NEs can introduce extra complexity for ML developers. Additionally, different electronic devices may have different numbers of NEs. Accordingly a system that allows for local ML calculations without requiring a client application to manage NE load balancing is desirable.

Accordingly, some embodiments provide a load balancer routine that can operate within a kernel. By operating in the kernel, the load balancer can access more information about resources on the chip. ML code for an application can be provisioned to run by a driver (e.g., as a preliminary step as part of a setup phase), so that any requests (inferences) to evaluate the ML code are ready to execute. These inference requests are what can be allocated across the circuit engines. Various logic and data can be used to determine how inference requests to evaluate a machine learning model are to be assigned (allocated).

I. NEURAL ENGINES ON CHIPS

Neural engines (NEs) can be systems on a chip. Each NE can include a neural engine processor (NEP) along with some other circuit elements, such as memory. The NEP is a circuit engine that is optimized to analyze neural networks, although other circuit engines can be optimized for other ML models. Various numbers of NEs can be present on a chip die, and multiple dies can be present on a device. Applications running on an application processor can include code for machine learning models, which can be executed on the NEs. Some example configurations are provided below.

Figure 1B:
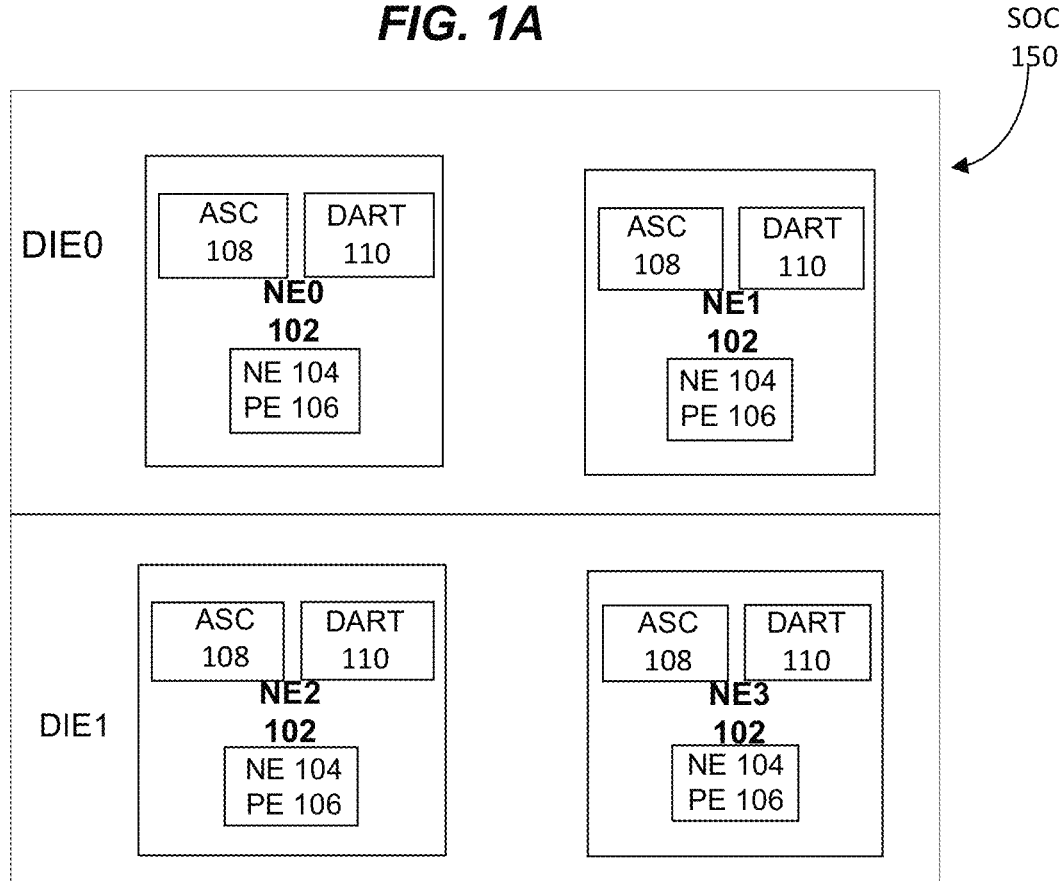
FIG. 1B illustrates an example SOC with four NEs according to embodiments of the present disclosure.

FIGS. 1A-1B shows possible NE 102 configurations with a single die configuration shown in FIG. 1A with two NEs 102 on one chip while FIG. 1B shows four NEs 102 on two separate dies. Additionally, a single NE 102 can be used in some configurations. A NE 102 can comprise a NEP 104, a planar engine (PE) 106, (ASC) 108, and (DART) 110. NEP 104 can evaluate a neural network or a portion thereof. Planar engine (PE) 106 can run in parallel with the NEP 104 and carry out preprocessing before work gets dispatched to the NEP 104. ASC 108 is a co-processor where the NE firmware runs; ASC 108 can facilitate processes that would not efficiently run on the neural engine processor.

The NEP 104 can be specialized hardware for evaluating a particular type of ML tasks, e.g., for evaluating a neural network. While a computer processing unit (CPU) can generally perform any operations, a NEP 104 can be specialized for neural network operations such as multiplication (e.g., as matrix operations) or convolutions. A respective NEP 104 (as well as the entire NE) can be optimized for any one of other machine learning models including specific types of neural networks (e.g., deep learning, convolutional neural networks, and recursive neural networks), kernel-based regressions, adaptive basis regression or classification, Bayesian methods, ensemble methods, logistic regression and extensions, Gaussian processes, support vector machines (SVMs), a probabilistic model, and a probabilistic graphical model.

While the NEP 104 is specialized for neural network operations, the NEP 104 can be inefficient at logic operations. The ASC 108 is a coprocessor for each NEP 104, and the ASC 108 can handle operations that would be inefficient to run on the NEP 104. For instance, the NE has firmware that can run on the ASC 108; the firmware is described in more detail in section II below.

DART 110 is the memory abstraction for the NE hardware. Any data buffers that the NE is going to direct memory access (DMA) from or DMA into can get mapped onto the DART 110. The virtual address, starting from the mapping, can be programed from the hardware to proceed with the DMAs. DART 110 can be set up by another driver that is running on an application processor, e.g., the processor on which the application whose ML model is to be evaluated. This other driver (described later as an NE driver framework) can interact with DART 110 to set up the mappings upfront and provide the virtual addresses to the firmware when an application submits the programs (i.e., the code to evaluate the ML model and the inference requests for the ML programs).

Devices with multiple NEs are desirable for a number of reasons. For instance, not all NE interfaces may be available because of terminal issues or software crashes. A device with multiple NEs could allocate requests to the functioning NE hardware while waiting for the remaining NEs to come back online. In other circumstances, applications can utilize multiple NEs for ensemble, bagging, or boosting techniques (e.g., gradient boosting), with different sub-models being allocated to different NEs. As another example, different models can be applied to an item (e.g., a photo or other image) or applied to multiple items. For instance, an application can involve applying multiple styles to a single camera frame, or multiple items (e.g., images) can be processed in parallel. A device with a single NE would have to wait for each style to complete before beginning subsequent requests. The application could have better throughput on a device with multiple NEs because a different request for each style could be sent to the hardware simultaneously. Similar techniques could be used where an application is using results from multiple NE networks. In some circumstances, an application could receive a similar increase in throughput by dividing a single network into multiple segments and running each segment simultaneously. The application or dispatch scheduler for an application can provide some information (referred to as a hint) to a load balancer to evaluate these multiple segments in parallel.

II. ARCHITECTURE WITH ONE NEURAL ENGINE (NE)

The architecture for single NE devices (including mobile devices, tablets, and personal computers) can be divided into user space and kernel space. The architecture allows user space clients, including both $1^{st}$ party and $3^{rd}$ party applications, to evaluate neural networks, or other ML models, without the clients having to manage the NE hardware. User space objects can authenticate clients and forward requests (also called inference requests) to evaluate a neural network on the NE to kernel space objects that dispatch the neural network to the NE hardware.

Figure 2:
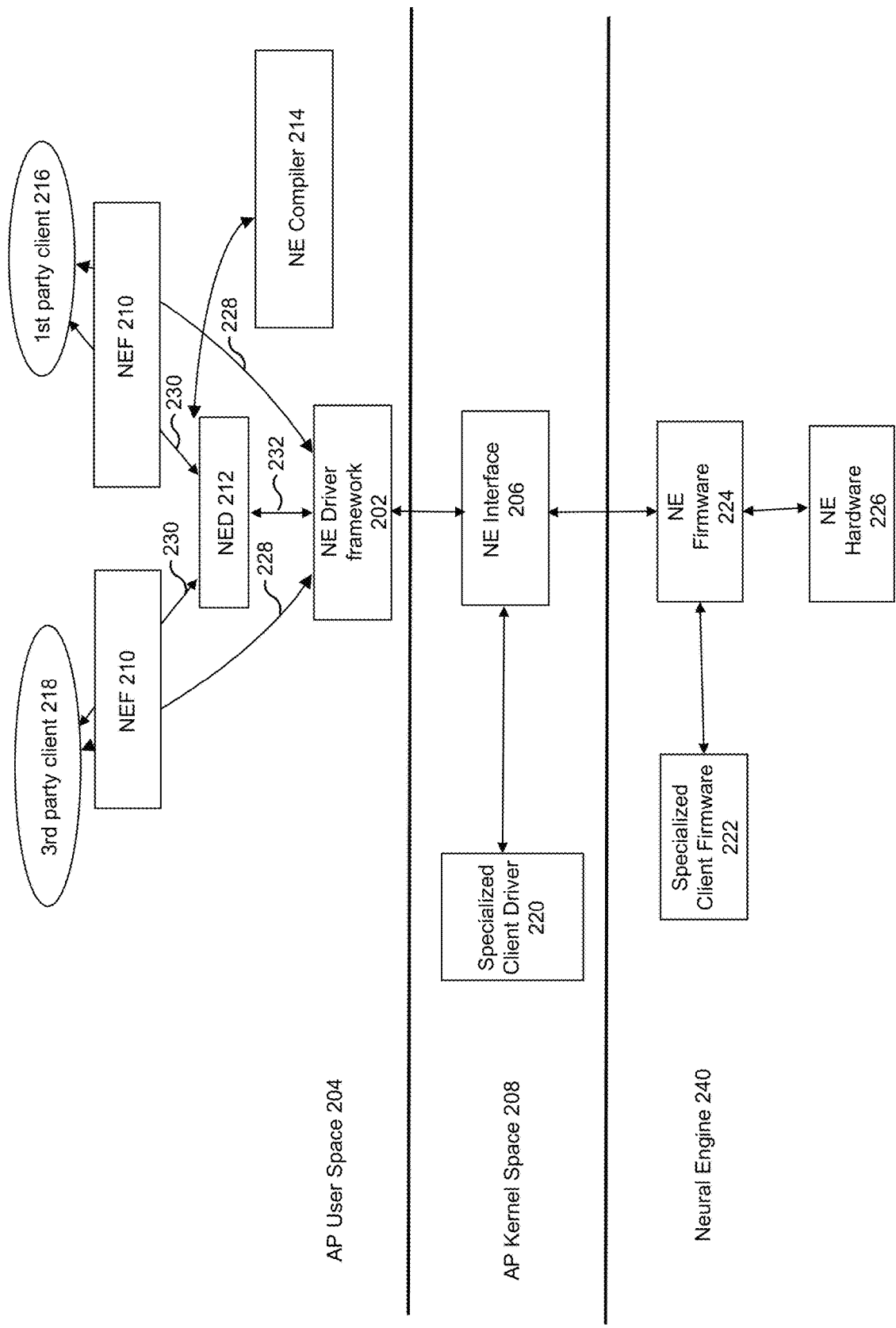
FIG. 2 shows an example architecture for a system with a single NE according to embodiments of the present disclosure.

FIG. 2 shows an example architecture for a system with a single NE according to embodiments of the present disclosure. A Kernel space 208 can be where the kernel and device drivers run, and can run on a general processor, e.g., an application processor (AP). Routines in Kernel space 208 can be privileged. A user space 204 is less privileged and is where the applications (clients) run. The client applications can also run on the AP, which is separate from a neural engine (NE) 240, which has dedicated circuitry for evaluating a neural network. A neural engine is just one example of a circuit engine that is configured to implement a ML model. An AP and the neural engine can be different circuits or different parts of the same integrated circuit.

A. User Space

User space 204 can include a $1^{st}$ party client 216 and a $3^{rd}$ party client 218. User space 204 can also include an NE framework (NEF) 210, an NE daemon (NED) 212, an NE driver framework 202, and an NE compiler 214. NE driver framework 202 is a user space 204 driver frame work that communicates with the NE interface 206 in the kernel space 208.

Clients can be either $1^{st}$ party applications (e.g., camera and augmented reality applications or frameworks incorporated into $3^{rd}$ party applications) or $3^{rd}$ party applications created by external developers that can be installed on the device. The clients can call a machine learning application programming interface (API) that communicates with NEF 210, which can run in a client application process and act as a scheduling engine to dispatch workloads bounds for the neural engine.

NEF 210 can communicate with NED 212 as part of an initial communication over privileged path 230, where the structure (e.g., number of layers and nodes, and parameter values of the neural network (NN)) is sent for compiling and preparation to execute on NE 240. For example, NEF 210 can split a NN into various segments that is suitable for each type of hardware. This initial communication can occur in a setup phase to establish infrastructure before a ML model is evaluated. Later, inference requests with specific inputs (e.g., a feature vector to be used as an input to the neural network that has been setup to run on NE 240) can be used to obtain an output of the ML model. NE compiler 214 can compile the NN, e.g., by generating specific instructions that are formulated for running on NE 240.

NED 212 can provide requests to NE driver framework 202, which can provide requests for NE 240 to Kernel space 208. Such requests can be as part of the initial registration (provisioning) of the NN for executing on NE 240 (as part of the setup phase) or as later requests for evaluating a registered NN. Provisioning can involve loading the NN onto a NE so that the NN is ready to run when requested. Communication between the NE driver framework 202 and NEF 210 can occur via privileged paths 230, 232 (involving the NED 212) or via a direct path 228 that is less privileged. Direct path 228 can be used for an inference request after the NN has already been compiled and registered with NE 240.

The privileged paths 230, 232 can be used to authenticate the client 216, 218 and use direct path 228 path for submitting requests to NE driver framework 202. NE driver framework 202 can communicate with other user space objects such as the NED 212 and NEF 210 via various paths. The privileged paths 230, 232 can involve a client 216, 218 communicating with NEF 210 to provision a NE to run a NN. Upon a client request, NEF 210 can communicate with NED 212, which (e.g., after performing a security check) can establish a direct path 228 between the client and NE driver framework 202. NED 212 can also handle other tasks such as instructing NE compiler 214 to compile a NN.

As described above, after initial communication to provision a NE via the privileged path 230, 232, subsequent communication to evaluate a specific request can occur through direct path 228 between the NEF 210 and NE driver framework 202. Direct path 228 is the path that is used to communicate an inference request to evaluate a NN on a NE. When a client attempts to send a communication through direct path 228, NEF 210 can determine if the client previously initiated communication through privileged paths 230, 232 to ensure that the client attempting to access a model initially submitted the request to evaluate that model. This can ensure that one client does not errantly run a model that was provisioned by a different client. Multiple clients can send inferences requests at roughly the same time. In direct path 228, only the APIs necessary to dispatch the work to the NEF are exposed. Communication can be authenticated by kernel level APIs (e.g., code signing identification (ID) check or application specific team IDs). If the client is authenticated as a client that was loaded through the NED 212, the NEF 210 can forward the request directly to NE driver framework 202 using direct path 228.

NEF 210 can also allocate non-ML work by dispatching tasks to appropriate hardware after segmenting the work into sections based on the hardware needed for each section. Once the work is divided, each segment can be dispatched to the appropriate hardware.

B. Kernel Space

Kernel space 208 can be a privileged computer memory region with software that facilitates interactions between applications and hardware. Kernel space 208 can include the NE interface 206 and a specialized client driver 220.

NE interface 206 can receive inference requests to evaluate a NN from user space 204 through NE driver framework 202. Requests received by NE interface 206 can be passed to the NE 240 for evaluation. The results from an evaluated request can be retrieved from NE 240 by NE interface 206. In some implementations, the NE interface 206 can send the results directly to clients 216, 218.

NE 240 can have several queues with each queue having NE interface 206 assign quality of service (QoS) priority. QoS refers to differentiated handling of traffic so that limited resources are allocated appropriately. QoS can be based on various quantitative measures such as latency, error rate, jitter, throughput, and availability. Differentiated traffic can mean that resources are allocated to an application based on its priority. Priority can be based on each client's needs and clients can be divided into QoS based categories with applications involving real time traffic (RTT) having the highest priority followed by interactive apps, foreground apps, and background apps. The QoS-based priority is intended to improve the user's experience. For instance, a user may notice an increase in latency for RTT while latency may be unnoticed in a background application. Accordingly, resources can be prioritized for the RTT at the background application's expense. In some implementations, when multiple interactive applications are in the queue, a higher QoS priority is given to an interactive application that is receiving user input. Specialized client driver 220 is discussed below in section II.D. Further details about QoS scheduling are described in section IV.A.

C. Neural Engine

NE is the hardware and software used to enqueue and evaluate an inference request. NE 240 can include NE firmware 224 (e.g., as implemented on ASC 108 of FIGS. 1A-1B), NE hardware 226, and specialized client firmware 222.

NE firmware 224 can use NE hardware 226 to evaluate a NN. NE firmware 224 can implement certain portions of inference requests (e.g., certain logic portions) sent by NE driver framework 202. NE firmware 224 can receive a request from the NE interface 206 and enqueue the NN to NE hardware 226. After evaluation, NE hardware 226 can return the evaluated NN to NE firmware 224, which forwards the NN to the NE interface 206. Specialized client firmware 222 is discussed below in section II.D.

D. Private Link

Some specialized clients with a high QoS priority, e.g., applications with RTT, may need to be processed on a strict deadline. Specialized clients can be loaded onto NE 240 through a private link between the specialized client and the NE interface or firmware. The private link can be a direct connection between a specialized client (e.g., software for a camera) and NE interface 206 or NE firmware 224. As part of the private link, the specialized client driver 220 and NE interface 206 can directly connect. Additionally, a path can exist between the specialized client firmware 222 and NE firmware 224. The private link can be configured on the NE device or it could be configured by a client.

As an example, the private link can be used for low level image processing such as white balancing or tone mapping. This image processing may occur at a firmware level for basic image processing of camera frames. Once the image is initially processed through the private link, the client can send more requests to evaluate NNs or perform other functions on the image. For instance, a client may want to use a tone balancing algorithm on faces in an image. The specialized client driver 220 can receive an inference request from the client and send the inference request to NE interface 206 so that a face detection network can be run on the image. The client can send the image from specialized client firmware 222 to NE firmware 224 for processing. After any faces are detected, the image can be sent back to the client so that the algorithm running in the specialized client firmware 222 can tone map.

III. ARCHITECTURE WITH MULTIPLE NEURAL ENGINES

Devices with multiple neural engines introduce the problem of how to allocate requests to the appropriate NE hardware. Ideally, additional NEs should not introduce added complexity for the clients. Allocating requests to individual NEs can be handled through a kernel space load balancer that receives and distributes inference requests. The load balancer can expose the same interface to the user space as a NE interface. The load balancer can allocate requests to individual interfaces based on logic, e.g., as described in section IV.

Figure 3:
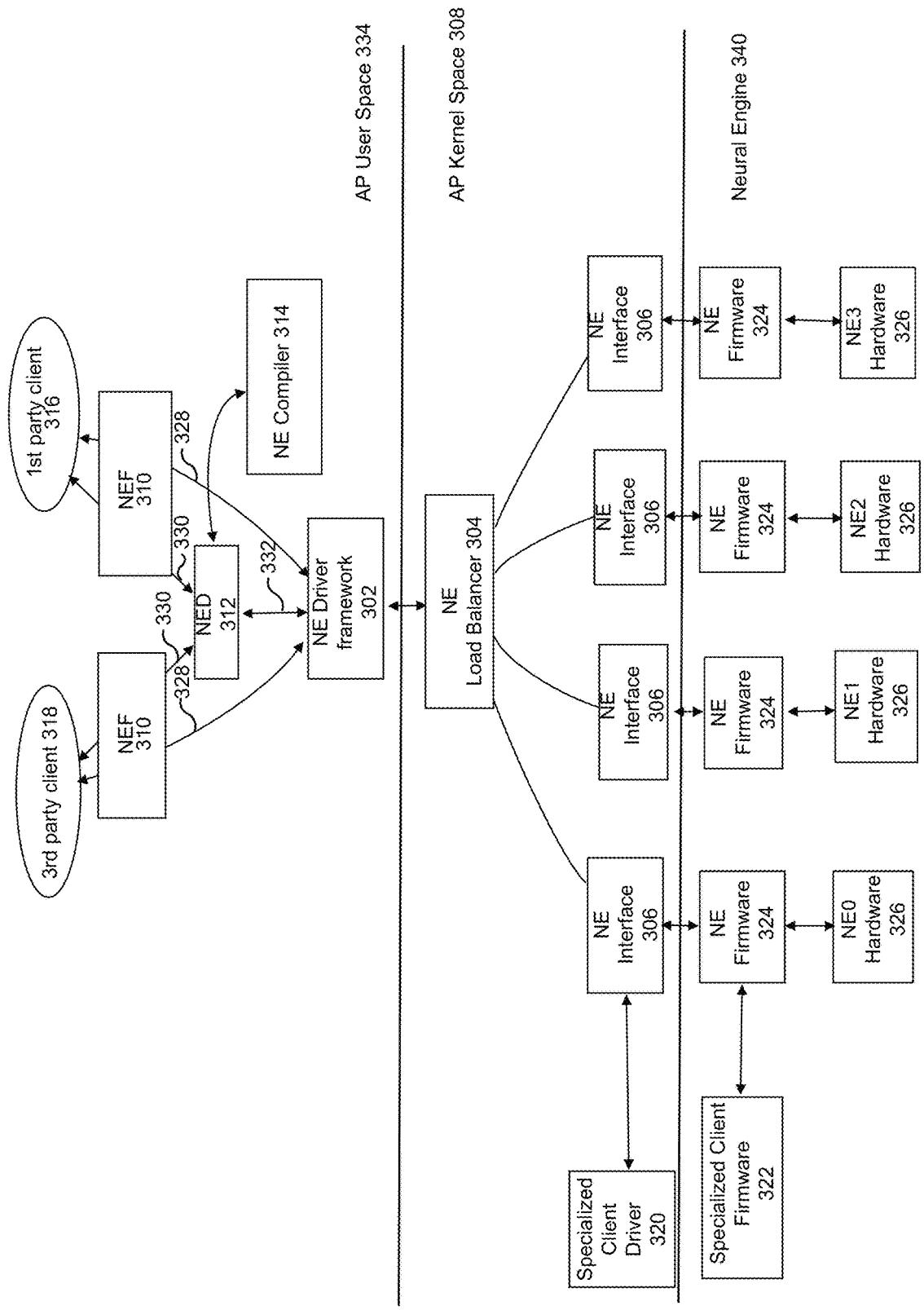
FIG. 3 shows an example architecture for a system with multiple NEs according to embodiments of the present disclosure.

FIG. 3 shows an example architecture for a system with multiple NEs according to embodiments of the present disclosure. The architecture with multiple NEs has a kernel space 308 that includes a load balancer 304, which facilitates allocating client 316, 318 requests to individual NE interfaces 306. Other aspects of the system architecture for multiple NE devices can be similar to the architecture for single NE devices.

A. Load Balancer

Load balancer 304 can allow for multi-NE systems without introducing added complexity for the client. Accordingly, the allocation of requests in an architecture with multiple NEs can be similar to the process described above with regard to FIG. 2. Clients 316, 318 can provision a NE through the privileged pathways 330, 332 that reach NE driver framework 302 through NEF 310 and NED 312. The NED 312 in an architecture with multiple NEs, like the one for a single NE architecture, can instruct NE compiler 314 to compile the NN. Subsequent communication (e.g., inference requests) can occur via direct path 328 between NEF 310 and NE driver framework 302.

Load balancer 304 is a kernel space object that exists between the user space 334 and the multiple NE interfaces 306. Load balancer 304 can detect any available NE interfaces 306 and keep interface requests loaded and mapped onto individual NE interfaces 306. Once a connection between a client and a particular NE interface 306 is established by the load balancer 304, the load balancer can move out of the way and responses can flow directly from NE interface 306 to clients 316, 318. This direct path from NE interfaces to clients 316,318 for the results is not shown for ease of illustration, but is shown as path 426 in FIG. 4. Upon receiving the request to evaluate a NN, NE interface 306 can send the request to the NE 340, where NE firmware 324 can load the request onto NE hardware 326.

If NE driver framework 302 detects load balancer 304, NE driver framework 302 can connect with load balancer 304 rather than directly with NE interfaces 306. Once a connection is established, load balancer 304 can present the same interface to NE driver framework 302 as an individual NE interface 206 would on a single NE system. Load balancer 304 can help to simplify the user space architecture because NE driver framework 302 is presented with the same kernel space interface, regardless of the number of NE interfaces 306. Additionally, load balancer 304 can handle request allocation, and user space objects are not required to call kernel space APIs.

NE driver framework 302 can send requests to load balancer 304, without considering which NE interface 306 should receive the request, and load balancer 304 can allocate the request to a particular NE interface 306. An advantage of load balancer 304 is that if a NE interface 306 is unavailable because of a hardware or software issue (e.g., the NE has crashed), load balancer 304 can allocate requests to any remaining NE interfaces 306 seamlessly without the client having to address the error. Once the unavailable NE interface 306 becomes available, load balancer 304 can reallocate requests to the newly available NE interface 306.

Load balancer 304 can allocate requests using a logic based on the QoS of individual applications. The highest priority can be given to RTT applications followed by interactive applications, foreground applications, and background applications. RTT applications can also communicate through a private link with direct communication between the specialized client driver 320 and the NE interface 306 or the specialized client firmware 322 and the NE firmware 324. The logic for how the load balancer allocates work to NE hardware is discussed in greater detail in section IV.

Additionally, load balancer and allocate different segments of a ML model to different engines. For example, NEF 310 can split a ML model into various segments that is suitable for different types of hardware or different engines. If the ML model can only be run on one NE, NEF can just use a single segment and dispatch the segment to NE driver framework 302. But if the ML model can be run on different NEs, then NEF 310 can split the ML model into two or more segments and provide a hint for load balancer 304 to evaluate the segments in parallel (i.e., simultaneously).

B. Load Balancer Callback Function

Figure 4:
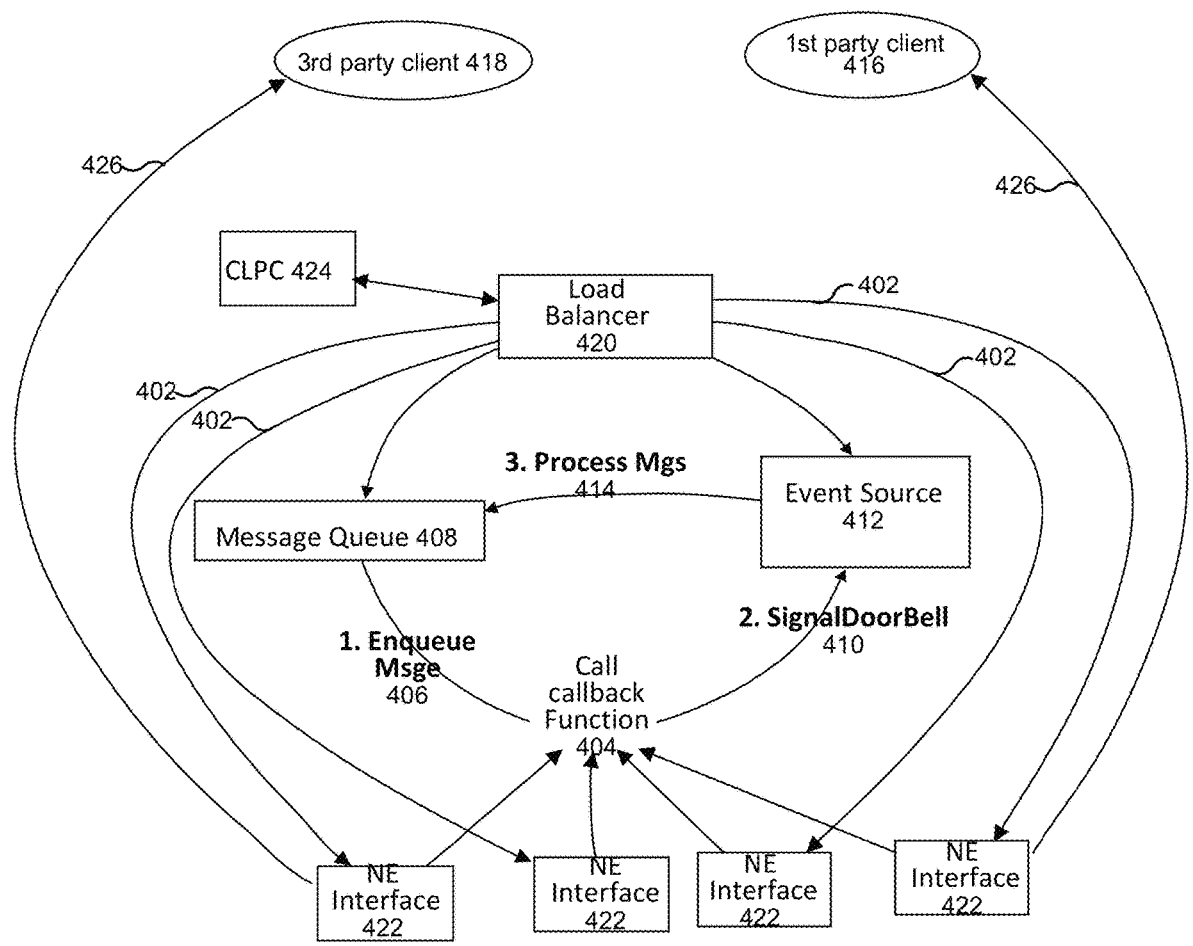
FIG. 4 illustrates example load balancer callback function according to embodiments of the present disclosure.

FIG. 4 shows an example load balancer callback function. The callback function 404 acts as an asynchronous application that exists between NE interfaces 422 and a load balancer 420 to provide statistics. The statistics provided by the callback function 404 can give state information from the NE so for the next request to load balancer 420 has up-to-date information from NE interfaces 422. While load balancer 420 can allocate requests 402 to individual NE interfaces 422, responses from NE interfaces 422 can be sent directly to the clients 416, 418. However, even though clients 416, 418 can receive responses through a client callback path 426 directly from a NE interface 422, the client 416, 418 may not be able to respond to NE interfaces 422.

Accordingly, NE interfaces 422 can send information to load balancer 420 via callback function 404. NE interfaces 422 can send state information so that load balancer 420 has up-to-date information from NE driver interfaces 422. Callback function 404 can also provide load balancer 420 with statistics and information about failure conditions on NE interfaces 422. In the event of a failure condition load balancer 420 can use callback function 404 information for error handling.

Load balancer 420 can include a message queue 408 and an event source 412. Message queue 408 can contain communications from all of NE interfaces 422 on a device. Messages to callback function 404 can be enqueued 406 to message queue 408. When a message is added to message queue 408, a doorbell signal 410 can be sent to event source 412 to indicate to load balancer 420 that a message is in message queue 408. In response, load balancer can dequeue and process 414 any pending messages. Message queue 408 allows load balancer 420 to process the messages from NE interfaces 422 sequentially.

C. Closed Loop Performance Control

The closed loop performance control (CLPC) 424 is a system level entity that can provide hardware related information to the load balancer 420. CLPC 424 can interact with NE interfaces 422 to determine the status of work submitted to NE interfaces 422, including whether work has been submitted to the driver, whether the driver has started work, and if work has been completed. CLPC 424 can have a complete view of the hardware resources used by a particular client. For instance, CLPC 424 could know that a client requesting to run on a NE is also running on a CPU and using GPU resources. The NE performance counters can also be monitored by CLPC 424 to perform performance control for the NE. CLPC can provide information about which NE is running faster (e.g., at a higher frequency) or is higher performing than another NE. CLPC 424 can provide this information to load balancer 420 as CLPC hints (e.g., that can include NE frequency, power budget, and system performance) discussed below in section V.A.3.

IV. LOAD BALANCING LOGIC

The load balancer can use various information and data to determine how to allocate different NNs, or parts of the same NN, to different NEs. Load balancing can occur on a per inference basis so the load balancer can allocate individual networks, or network sections, to a specific NE rather than assigning one application to a particular NE.

Figure 5:
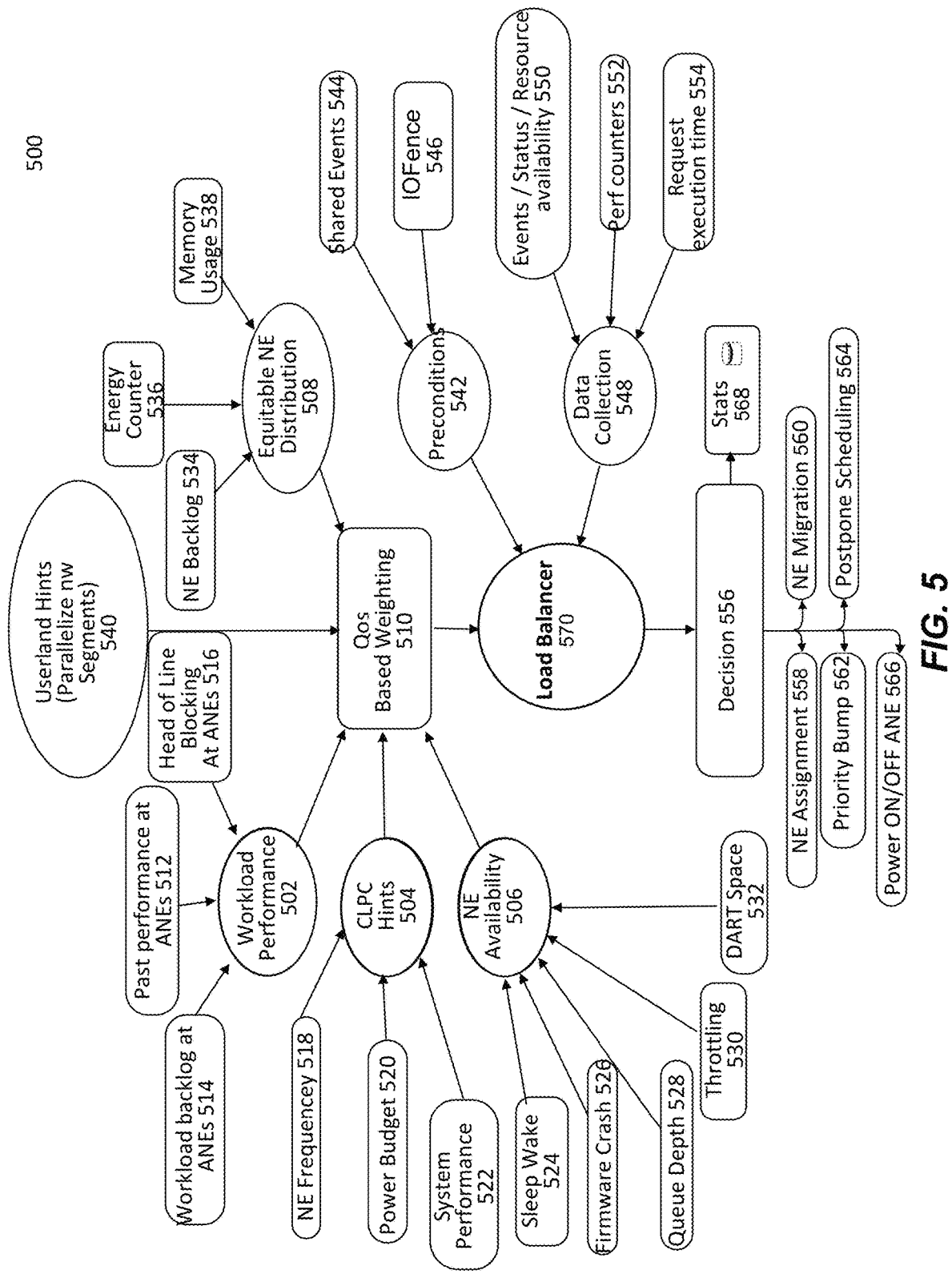
FIG. 5 illustrates a system diagram showing example load balancing logic according to embodiments of the present disclosure.

FIG. 5 illustrates a system 500 showing example load balancing logic according to embodiments of the present disclosure. FIG. 5 shows a variety of information and criteria that a load balancer 570 can use to determine how to allocate a NN (or other ML model) to the circuit engines. Load balancer 570 can prioritize requests based on the QoS of the client attempting to use the NE resources. Specific inputs can be assigned respective weights based on the QoS desired or assigned to a client. For instance, inputs related to performance can be assigned a greater weight for high priority applications while efficiency is emphasized for low priority applications.

In some instances, clients with a high QoS priority can be mapped to multiple NEs while clients with a low priority QoS can be mapped to a limited number of NEs. Provisioning for clients with a high QoS priority can involve loading the client's machine learning model onto multiple NEs so that the model can be pending at several NEs simultaneously, so any of these NEs can be selected to evaluate the model when an inference request is received. Upon receiving an inference request, the model can be evaluated at the first available NE so that requests from the client with high QoS priority are evaluated as quickly as possible. If the NN was loaded onto a single NE at provisioning, the evaluation could be delayed until another NN evaluating on the NE finished processing (e.g., head of line blocking).

Load balancer 570 can consider a NE preference score (e.g., generated using the QoS-based weighting 510), preconditions 542, and data collection 548 when making a decision 556. Each request can receive a set of NE preference scores with one NE preference score for each NE. A request can be assigned to the NE with the highest NE preference score for that request. Inputs to the QoS-based weighting 510 can include workload performance 502, CLPC hints 504, NE availability 506, equitable NE distribution 508 (e.g., roughly uniform distribution of workload), and userland hints 540. Certain requests can be tied together (e.g., based on userland hints 540), which can affects preferences scores, e.g., to ensure that the two request are evaluated in a similar time frame. The scores from the various components can be normalized so that they may be aggregated for obtain a final score, e.g., for a given request for a given NE.

A. QoS Based Weighting

QoS based weighting can involve assigning a NE preference score to a request for the NEs based on inputs to the QoS-based weighting that reflect NEs current status and historical information. The inputs can be weighted and normalized based on the client's QoS priority to determine a NE preference score that is used to allocate requests. In some implementations, clients with RTT are given the highest QoS priority. Interactive clients can have the second highest QoS priority, followed by foreground clients, with background clients having the lowest QoS priority. When there are multiple interactive clients, priority can be given to the interactive client receiving input from the user. Additionally, if an interactive application is currently waiting on the output from a RTT process (e.g., an app using RTT tone balanced images), the QoS-based weighting can be used to assign the RTT request and the interactive application request to separate NEs. If the RTT and the interactive application were assigned to the same NE, a user may experience delay if the interactive application could have to wait until the RTT requests are processed before the interactive application requests could be addressed. Also, if requests from an interactive app are already pending for an NE, then another NE can be selected.

The weight assigned to inputs to QoS based weighting 510 can be different for each QoS priority level. For high QoS priority clients, workload performance 502 can be assigned a higher weight, while equitable NE distribution 508 can be given less weight. Conversely, for low QoS priority clients, equitable NE distribution 508 can be prioritized over workload performance 502. Similarly, CLPC hints 504 can be assigned a higher weight for higher QoS priority clients. As examples, QoS-based weighting 510 inputs include workload performance 502, CLPC hints 504, NE availability 506, equitable NE distribution 508, and userland hints 540. In some implementations, NEs can be assigned a preference score from 0 to 100 based on the above mentioned factors. The individual criteria used in the QoS-based weighting are discussed in the following sections below.

1. Workload Performance

Input to the QoS-based weighting can include workplace performance, which provides information about how individual requests are running on a particular NE. Workload performance 502 can be information about how a particular NE is performing compared to other NEs or that NE's historical data. Thus, workload performance 502 data can also include the past performance 512 at NEs, which concerns how well requests are executing at a particular NE, e.g., a duration of execution and whether the duration is higher or lower than expected. Past performance 512 at NEs can be used to dispatch requests to the NE with optimum performance.

The workload backlog 514 at the NEs is another input to workload performance 502. Workload backlog 514 at the NEs can be information about the total number of requests pending at a NE at all priority levels.

An additional workload performance 502 input is head of line blocking 516, which can be the amount of requests pending at a single priority level. The head of line blocking input could be used to discourage assigning a request to a NE with a large backlog at that request's priority level if another NE is available. Thus, the priority distribution in the overall backlog can be considered.

2. CLPC Hints

Inputs to QoS-based weighting 510 can include application hints about the hardware performance of individual NEs. Such an application hint can be provided to QoS-based weighting 510 as output from the CLPC, called CLPC hints 504. CLPC hints 504 can be used, as part of the QoS based weighting, to generate a NE preference score.

As an example, CLPC hints 504 can include the NE frequency 518. Integrated circuits operate at different frequencies because of variance in the manufacturing process. Circuits operating at a higher frequency can complete calculations more rapidly compared to lower frequency circuits. NE frequency 518 allows the QoS-based weighting 510 to assign high QoS priority requests to the fastest NE.

CLPC hints 504 can also include a power budget 520 for each NE. A NE that exceeds its power budget can be throttled so that the NE is running at a reduced duty cycle. A throttled NE can perform poorly compared to a NE that is not throttled. Accordingly, in some implementations, throttled NEs will be disfavored for high QoS priority requests.

System performance 522 can be another CLPC hint 504. System performance can relate to a performance benefit from having the NE and the CPU running the client collocated on a particular die. System performance 522 can increase the NE preference score for a NE that is collocated with the client's processor. System performance 522 can also account for whether an application is also using a GPU. The CPLC may not know the resource constraints of the NEs, but other QoS factors can account for resource constraints (e.g. workload performance 502) that are merged with CLPC hints 504 to determine a final score, or an intermediate score that is used to determine a final score.

3. NE Availability

NE availability 506 can also be an input to QoS-based weighting 510. NE availability 506 inputs can include sleep wake 524, which can indicate whether the system is entering a low power mode. If a NE is entering sleep, the NE may not be used for an application request.

Similarly, firmware crash 526 can be another input (or contribution to a score) for NE availability 506. Firmware crash 526 can indicate that a hardware failure or software bug has caused the NE to reboot. If the NE has experienced a firmware crash 526, the NE may not be used for application requests. In some implementations, the sleep wake 524 and firmware crash 526 indicators can be considered fatal and the weight for the indicators can be set to 100%. Accordingly, in some circumstances no application requests will be added to a queue at a NE with either indicator.

An additional NE availability input, queue depth 528, can be the total number of requests in the queue for a particular NE. Queue depth 528 can indicate different values based on how many requests are in the queue. Alternatively, queue depth 528 can indicate whether the number of requests in the queue exceeds a threshold. The queue can be set to a maximum depth (e.g., 16, 32, or 64 in some implementations) based on the firmware resource constraints. If the queue at each NE is full, the request can be queued at the driver boundary until a NE is able to free resources.

NE availability 506 can include DART space 532, which can indicate the amount of memory available at each NE. If the DART space is full with pending requests, a request from a client with a lower QoS priority may be evicted to make space for a higher QoS priority request. The eviction can cause a delay that impacts performance so the DART space 532 is considered when allocating a request to a NE.

Throttling 530 is another input to NE availability 506 and throttling indicates whether a NE is experiencing reduced performance because the device is intentionally limiting the NE's speed. NE may be throttled for a number of reasons including if the NE is exceeding its allocated power consumption.

4. Equitable NE Distribution

Equitable NE distribution 508 can also be a QoS-based weighting 510 input. While factors such as workload performance 502, CLPC hints 504, and NE availability 506 generally prioritize performance over efficiency, equitable NE distribution 508 can reflect that QoS-based weighting 510 also considers the load balancing operation from a hardware scheduling standpoint.

NE backlog 534 is an input to equitable NE distribution 508 that can indicate whether the backlog of requests is even across all NEs. In some circumstances, the load balancer 570 could favor sending a new request to a NE with a shorter NE backlog 534 than average. Conversely, NEs with a longer than average NE backlog 534 could be disfavored.

Equitable NE distribution 508 also includes an energy counter 536 that can indicate the relative energy consumption of each NE. The load balancer 570 can favor NEs with lower power consumption while disfavoring NEs that are above average energy consumers.

Equitable NE distribution 508 can also include whether memory usage 538 is evenly distributed across available NEs. Generally, the memory usage 538 indicator would prioritize scheduling a request to a NE that is consuming lower than average DART space while disfavor scheduling a request to a NE with higher than average memory usage.

5. User Land Hints

Hints from user space clients about how to handle a particular inference request can also be included in the QoS-based weighting. These instructions, called userland hints 540, can be given a higher weight relative to the other QoS inputs. In some implementations, a NN from an application can be split into multiple segments and provisioned on separate NEs. Then, an inference request for the NN can indicate a hint to run both segments in parallel. For high QoS priority applications, it may be advantageous to run the segments in parallel on multiple NEs. The load balancer generally allocates requests individually and might not be aware that the two requests are related. An NEF (e.g., 310)

can provide userland hints 540 that are incorporated into QoS-based weighting 510 so that related requests are coordinated. The NEF can detect availability and dispatch workloads between any GPUs, CPUs and NEs. If a request has been split and the NEF detects that multiple NEs are available, the NEF can provide a hint to load balancer 570 so that the split requests that multiple segments are run in parallel.

B. Preconditions

Some inputs to the load balancer are not considered as part of the QoS based weighting. Preconditions 542 are one such input and can inform the load balancer 570 about whether a request is ready to be scheduled. Inputs to preconditions 542 can include shared events 544 and IOFence 546. Shared events 544 can indicate that other operations associated with the request are pending. For instance, if a request is waiting for data from an associated GPU operation, the NE request could be delayed until the GPU operation has been completed. But the NE can be kept primed (e.g., with parameter data of the ML model loaded into registers) so when data dependencies become available, then the work can immediately start.

C. Data Collection

Load balancer 570 can use global state information to make decisions 556 based on the device's current status. The global state information can be provided to the load balancer 570 through data collection 548. Data collection 548 can include state information 550, which provides detail about events, status, and resource availability. Additionally, data collection 548 can includes the performance counters 552, which can provide detail about hardware related activities within the computer system. Data collection 548 also includes request execution time 554, which indicates to the load balancer 570 how quickly the individual NEs are processing requests. A high QoS priority request may be assigned to a NE that is executing quickly while a low priority request could be sent to a low performing NE.

D. Decision

Load balancer 570 uses the NE availability score from QoS-based weighting 510, along with preconditions 542 and data collection 548 indications, to reach a decision 556 about how to handle an NE request. Decisions 556 can include NE assignment 558, which can be a decision to send a request to a particular NE. An additional decision 556 can be NE migration 560, which can involve reassigning a request from a first NE to a new NE. Load balancer can also decide to give a request a priority bump 562, which can be a change to a request's QoS priority. In addition, decisions 556 can include postponing scheduling 564 a request to a NE or a choice to power a NE on/off 566 depending on demand.

V. EXAMPLE METHOD

Figure 6:
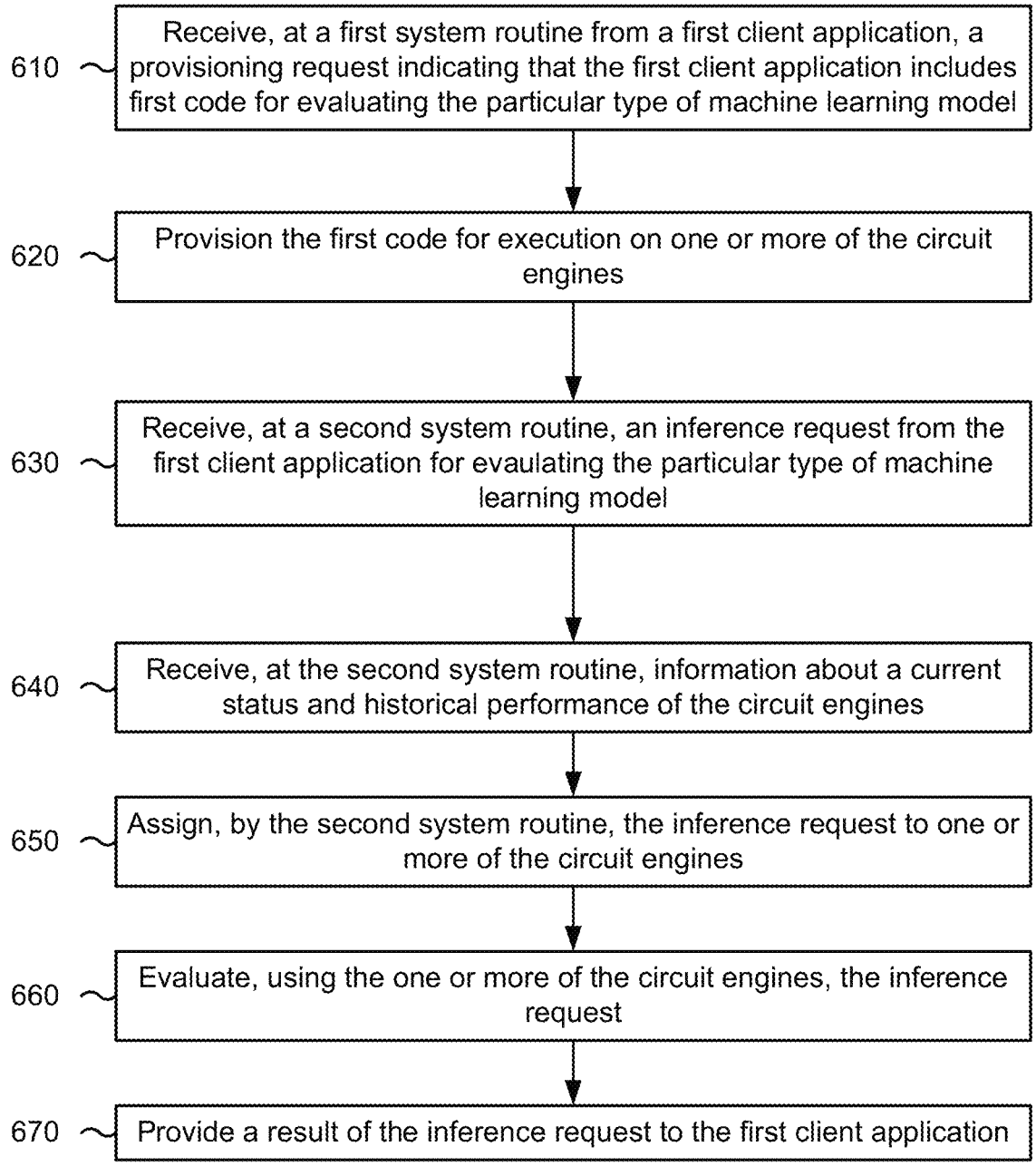
FIG. 6 illustrates a flow chart of a technique for kernel level load balancing across circuit engines according to embodiments of the present disclosure.

FIG. 6 is a flowchart of an example process 600 associated with kernel-level load balancing across neural engines. In some implementations, one or more process blocks of FIG. 6 may be performed by another device or a group of devices separate from or including the electronic device.

At block 610, a provisioning request is received at a first system routine (e.g., NED 312) from a first client application (e.g., $1^{st}$ party client 316, $3^{rd}$ party client 318). The provisioning request indicates that the first client application includes a first code for evaluating the particular type of machine learning model. The first system routine (e.g., NE driver framework 302) can execute in a user space of memory on the electronic device.

As an example, the particular machine learning model can be a neural network. As other examples, machine learning models can include specific types of neural networks (e.g., deep learning, convolutional neural networks, and recursive neural networks), kernel-based regressions, adaptive basis regression or classification, Bayesian methods, ensemble methods, logistic regression and extensions, Gaussian processes, support vector machines (SVMs), a probabilistic model, and a probabilistic graphical modelA client application can be a first party client or a third party client. An electronic device includes a handheld computer, a tablet computer, a mobile phone, laptop computer, a personal computer, tablet device, media player, personal digital assistant (PDA), a server, a multifunction device, a mobile phone, or the like, including a combination of two or more of these items.

At block 620, the first code can be provisioned for execution on one or more of the circuit engines (e.g., NE hardware 326). Provisioning the code for execution on the circuit engines can include dividing the code into multiple segments. As another example, provisioning the code for execution can also include compiling the code using a compiler specific to the particular type of machine learning model (e.g., NE compiler 314). A daemon can A circuit engine can be an integrated circuit optimized to evaluate ML models (e.g., NE 102).

At block 630, a second system routine (e.g., load balancer 304) can receive an inference request from the first client application for evaluating the particular type of machine learning model. The inference request can include first input data upon which the particular type of machine learning model is evaluated. The second system routine (e.g., NE load balancer 304) can execute in kernel space of memory on the electronic device. The inference request can be received by a third system routine (e.g., NE driver framework 302). In some implementations, the third system routine can receive the inference request directly from the first client application (e.g., via a framework, such as NEF 310, in the client application) instead of from the first system routine.

At block 640, the second system routine can receive information about a current status and historical performance of the circuit engines. Current status information could include software information (e.g. NE availability 506, equitable NE distribution 508, workload backlog 514 at NEs, head of line blocking 516 at NEs, userland hints 540), such as the amount of requests pending in the queue, or hardware information (e.g., CLPC hints 504), such as the frequency for each circuit engine. Historical performance information can include previous inference request execution times for each circuit engine (e.g., past performance 512 at NEs).

At block 650, the inference request can be assigned to one or more of the circuit engines. In some implementations, inference requests can be assigned based on a priority (e.g., QoS based priority) for the inference request, where the priority is determined based on a property (e.g., RTT, interactive etc.) of the first client application or based on a priority flag provided by the first client application. In other implementations, the inference requests can be assigned based on a hint, identifying the other hardware resources being used, provided by a kernel space performance control routine. Assigning the inference request can also be based on a hint from the client application to evaluate multiple inference requests on the circuit engines simultaneously.

At block 660, the inference request can be evaluated using the one or more of the circuit engines. Evaluating the inference request can include the second system routine providing the inference to a circuit interface (e.g., NE interface 306) dedicated to an assigned circuit engine (e.g., NE hardware 326). The circuit engine firmware (e.g., NE firmware 324) can receive the inference from the circuit interface and load the inference onto the circuit engine for evaluation.

At block 670, the result of the inference request can be provided to the first client application. The inference result can be provided to the first client application via a private link that bypasses the first system routine and the second system routine. The private link (e.g., the connection between specialized client driver 320 and NE interface 306) can be used by client applications to evaluate time sensitive inference requests.

Process 600 may include additional implementations, such as any single implementation or any combination of implementations described below and/or in connection with one or more other processes described elsewhere herein.

In some embodiments, process 600 includes receiving at the first system routine one or more additional provisioning requests from one or more second client applications. Additional code of the one or more second client applications can be provisioned for execution on the circuit engines. The second system routine can also receive additional inference requests for evaluating the particular type of machine learning model. The additional inference requests received at the second system routine can be assigned to the circuit engines based on the current status and historical performance of the circuit engines.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

VI. COMPUTER SYSTEM

Figure 7:
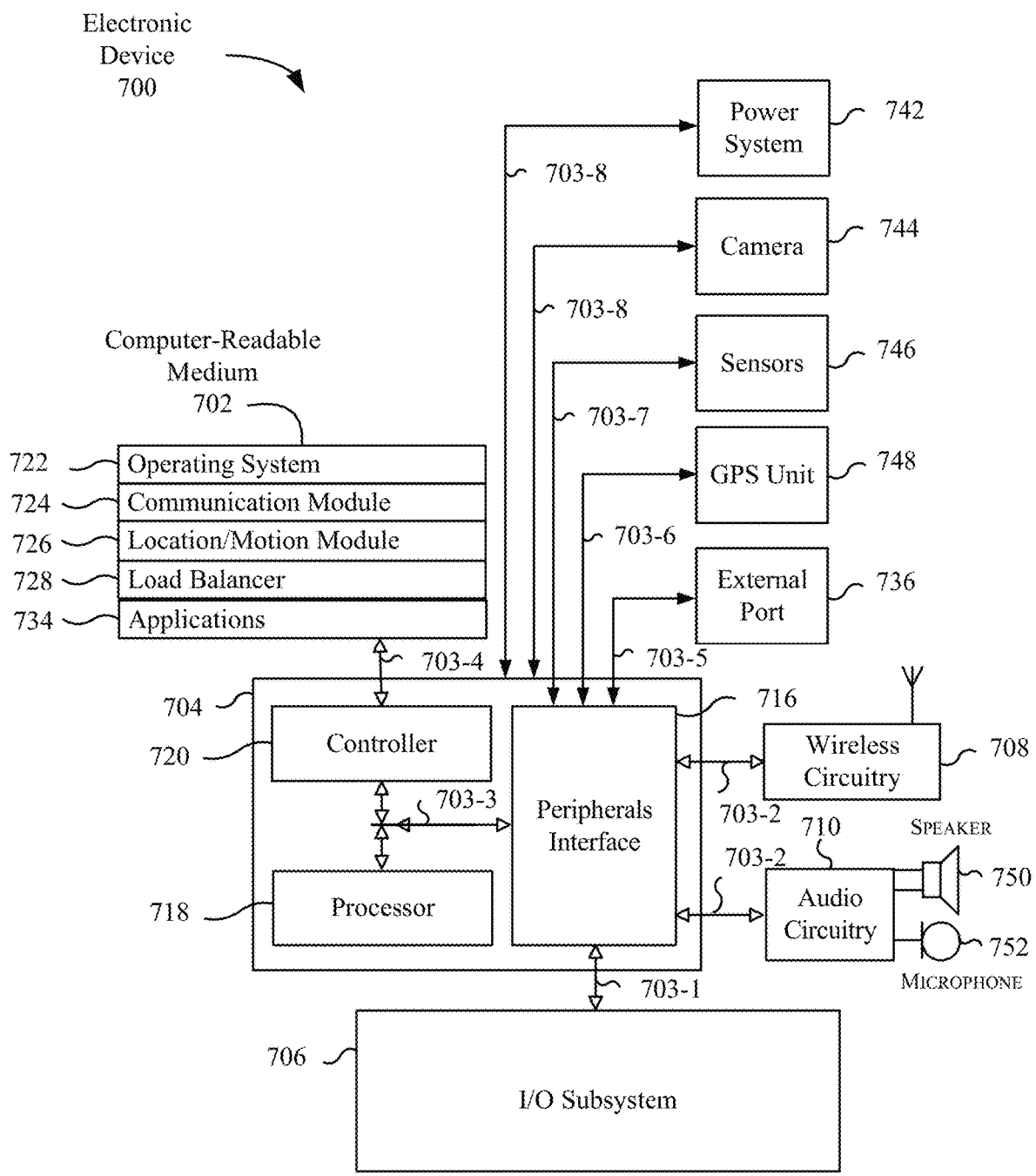
FIG. 7 is block diagram of an example device according to embodiments of the present disclosure.

FIG. 7 is a block diagram of an example electronic device 700. Device 700 generally includes computer-readable medium 702, control circuitry 704, an Input/Output (I/O) subsystem 706, wireless circuitry 708, and audio circuitry 710 including speaker 750 and microphone 752. These components may be coupled by one or more communication buses or signal lines 703. Device 700 can be any electronic device, including a handheld computer, a tablet computer, a mobile phone, laptop computer, a personal computer, tablet device, media player, personal digital assistant (PDA), a server, a multifunction device, a mobile phone, or the like, including a combination of two or more of these items.

It should be apparent that the architecture shown in FIG. 7 is only one example of an architecture for device 700, and that device 700 can have more or fewer components than shown, or a different configuration of components. The various components shown in FIG. 7 can be implemented in hardware, software, or a combination of both hardware and software, including one or more signal processing and/or application specific integrated circuits.

Wireless circuitry 708 is used to send and receive information over a wireless link or network to one or more other devices' conventional circuitry such as an antenna system, a radio frequency (RF) transceiver, one or more amplifiers, a tuner, one or more oscillators, a digital signal processor, a CODEC chipset, memory, etc. Wireless circuitry 708 can use various protocols, e.g., as described herein. In various embodiments, wireless circuitry 708 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), Long-term Evolution (LTE)-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 708 is coupled to control circuitry 704 via peripherals interface 716. Peripherals interface 716 can include conventional components for establishing and maintaining communication between peripherals and. Voice and data information received by wireless circuitry 708 (e.g., in speech recognition or voice command applications) is sent to one or more processors 718 via peripherals interface 716. One or more processors 718 are configurable to process various data formats for one or more application programs 734 stored on medium 702.

Peripherals interface 716 couple the input and output peripherals of device 700 to the one or more processors 718 and computer-readable medium 702. One or more processors 718 communicate with computer-readable medium 702 via a controller 720. Computer-readable medium 702 can be any device or medium that can store code and/or data for use by one or more processors 718. Computer-readable medium 702 can include a memory hierarchy, including cache, main memory, and secondary memory. The memory hierarchy can be implemented using any combination of RAM (e.g., Standard Random Access Memory (SRAM), Dynamic Random Access Memory (DRAM), Double Data Random Access Memory (DDRAM), Read only Memory (ROM), FLASH, magnetic and/or optical storage devices, such as disk drives, magnetic tape, CDs (compact disks) and DVDs (digital video discs)). In some embodiments, peripherals interface 716, one or more processors 718, and controller 720 can be implemented on a single chip, such as control circuitry 704. In some other embodiments, they can be implemented on separate chips.

Processor(s) 718 can include hardware and/or software elements that perform one or more processing functions, such as mathematical operations, logical operations, data manipulation operations, data transfer operations, controlling the reception of user input, controlling output of information to users, or the like. Processor(s) 718 can be embodied as one or more hardware processors, microprocessors, microcontrollers; field programmable gate arrays (FPGAs), application-specified integrated circuits (ASICs), or the like. Processor(s) 718 can also include specialized circuit engines for evaluating machine learning models.

Device 700 may include storage and processing circuitry such as control circuitry 704. Control circuitry 704 may include storage such as hard disk drive storage, nonvolatile memory (e.g., flash memory or other electrically-programmable-read-only memory configured to form a solid-state drive), volatile memory (e.g., static or dynamic randomaccess-memory), etc. Processing circuitry in control circuitry 704 may be used to control the operation of device 700. This processing circuitry may be based on one or more microprocessors, microcontrollers, digital signal processors, baseband processor integrated circuits, application specific integrated circuits, etc.

Control circuitry 704 may be used to run software on device 700, such as internet browsing applications, voice-over-internet-protocol (VOIP) telephone call applications, email applications, media playback applications, operating system functions, etc. To support interactions with external equipment, control circuitry 704 may be used in implementing communications protocols. Communications protocols that may be implemented using control circuitry 704 include internet protocols, wireless local area network protocols (e.g., IEEE 802.11 protocols—sometimes referred to as Wi-Fi®), protocols for other short-range wireless communications links such as the Bluetooth® protocol, cellular telephone protocols, multiple-input and multiple-output (MIMO) protocols, antenna diversity protocols, satellite navigation system protocols, millimeter wave communications protocols, IEEE 802.15.4 ultra-wideband communications protocols, etc.

Device 700 may include input/output subsystem 706. Input/output subsystem 706 may include input-output devices. Input/output devices may be used to allow data to be supplied to device 700 and to allow data to be provided from device 700 to external devices. Input/output devices may include user interface devices, data port devices, and other input-output components. For example, input/output devices may include one or more displays (e.g., touch screens or displays without touch sensor capabilities), one or more image sensors 744 (e.g., digital image sensors), motion sensors, and speakers 750. Input-output device may also include buttons, joysticks, scrolling wheels, touch pads, key pads, keyboards, microphones 752, haptic elements such as vibrators and actuators, status indicators, light sources, audio jacks and other audio port components, digital data port devices, light sensors, capacitance sensors, proximity sensors (e.g., a capacitive proximity sensor and/or an infrared proximity sensor), magnetic sensors, and other sensors and input-output components.

Device 700 also includes a power system 742 for powering the various hardware components. Power system 742 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 700 includes an image sensor 744 (e.g., a camera). In some embodiments, device 700 includes sensors 746. Sensors can include accelerometers, compass, gyrometer, pressure sensors, audio sensors, light sensors, barometers, and the like. Sensors 746 can be used to sense location aspects, such as auditory or light signatures of a location.

In some embodiments, device 700 can include a Global Positioning System (GPS) receiver, sometimes referred to as a GPS unit 748. A mobile device can use a satellite navigation system, such as the GPS, to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 718 run various software components stored in medium 702 to perform various functions for device 700. In some embodiments, the software components include an operating system 722, a communication module 724 (or set of instructions), a location module 726 (or set of instructions), a load balancing module 728 and other application programs 734 (or set of instructions).

Operating system 722 can be any suitable operating system, including iOS, Mac OS, Darwin, Quatros Real-Time Operating System (RTXC), LINUX, UNIX, OS X, WINDOWS, or an embedded operating system such as VxWorks. The operating system can include various procedures, sets of instructions, software components, and/or drivers for controlling and managing general system tasks (e.g., memory management, storage device control, power management, etc.) and facilitates communication between various hardware and software components.

Communication module 724 facilitates communication with other devices over one or more external ports 736 or via wireless circuitry 708 and includes various software components for handling data received from wireless circuitry 708 and/or external port 736. External port 736 (e.g., universal serial bus (USB), FireWire, Lightning connector, 60-pin connector, etc.) is adapted for coupling directly to other devices or indirectly over a network (e.g., the Internet, wireless local area network (LAN), etc.).

Location/motion module 726 can assist in determining the current position (e.g., coordinates or other geographic location identifiers) and motion of device 700. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 726 receives data from GPS unit 748 and analyzes the signals to determine the current position of the mobile device. In some embodiments, location/motion module 726 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 708 and is passed to location/motion module 726. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 700 based on the position coordinates of the corresponding transmitters. Regardless of the specific location technology used, location/motion module 726 receives information from which a location fix can be derived, interprets that information, and returns location information, such as geographic coordinates, latitude/longitude, or other location fix data.

Load balancing module 728 can receive requests from applications 734 to analyze a ML model on a NE. The requests can be used for various purposes, e.g., for image processing of frames from the image sensors 744 or for augmented reality applications. Load balancing module 728 can exist on various processors of the device 700, e.g., an always on processor (AOP), an NE chip, and/or an application processor. For instance, parts of load balancing module 728 can receive a request from an application 734 and assign that request to a particular NE.

Dielectric-filled openings such as plastic-filled openings may be formed in metal portions of housing such as in metal sidewall structures (e.g., to serve as antenna windows and/or to serve as gaps that separate portions of antennas from each other).

Antennas may be mounted in housing. If desired, some of the antennas (e.g., antenna arrays that may implement beam steering, etc.) may be mounted under dielectric portions of device 700 (e.g., portions of the display cover layer, portions of a plastic antenna window in a metal housing sidewall portion of housing, etc.). With one illustrative configuration, some or all of rear face of device 700 may be formed from a dielectric. For example, the rear wall of housing may be formed from glass plastic, ceramic, other dielectric. In this type of arrangement, antennas may be mounted within the interior of device 700 in a location that allows the antennas to transmit and receive antenna signals through the rear wall of device 700 (and, if desired, through optional dielectric sidewall portions in housing). Antennas may also be formed from metal sidewall structures in housing and may be located in peripheral portions of device 700.

To avoid disrupting communications when an external object such as a human hand or other body part of a user blocks one or more antennas, antennas may be mounted at multiple locations in housing. Sensor data such as proximity sensor data, real-time antenna impedance measurements, signal quality measurements such as received signal strength information, and other data may be used in determining when one or more antennas is being adversely affected due to the orientation of housing, blockage by a user's hand or other external object, or other environmental factors. Device 700 can then switch one or more replacement antennas into use in place of the antennas that are being adversely affected.

Antennas may be mounted at the corners of housing, along the peripheral edges of housing, on the rear of housing, under the display cover layer that is used in covering and protecting display on the front of device 700 (e.g., a glass cover layer, a sapphire cover layer, a plastic cover layer, other dielectric cover layer structures, etc.), under a dielectric window on a rear face of housing or the edge of housing, under a dielectric rear wall of housing, or elsewhere in device 700. As an example, antennas may be mounted at one or both ends of device 700 (e.g., along the upper and lower edges of housing, at the corners of housing, etc.).

Antennas in device 700 may include cellular telephone antennas, wireless local area network antennas (e.g., Wi-Fi® antennas at 2.4 GHz and 5 GHz and other suitable wireless local area network antennas), satellite navigation system signals, and near-field communications antennas. The antennas may also include antennas that support IEEE 802.15.4 ultra-wideband communications protocols and/or antennas for handling millimeter wave communications. For example, the antennas may include two or more ultra-wideband frequency antennas and/or millimeter wave phased antenna arrays. Millimeter wave communications, which are sometimes referred to as extremely high frequency (EHF) communications, involve signals at 60 GHz or other frequencies between about 7 GHz and 400 GHz.

Wireless circuitry in device 700 may support communications using the IEEE 802.15.4 ultra-wideband protocol. In an IEEE 802.15.4 system, a pair of devices may exchange wireless time stamped messages. Time stamps in the messages may be analyzed to determine the time of flight of the messages and thereby determine the distance (range) between the devices.

Image sensors 744 may include one or more visible digital image sensors (visible-light cameras) and/or one or more infrared digital image sensors (infrared-light cameras). Image sensors 744 may, if desired, be used to measure distances. For example, an infrared time-of-flight image sensor may be used to measure the time that it takes for an infrared light pulse to reflect back from objects in the vicinity of device 700, which may in turn be used to determine the distance to those objects. Visible imaging systems such as a front and/or rear-facing camera in device 700 may also be used to determine the position of objects in the environment. For example, control circuitry 704 may use image sensors 744 to perform simultaneous localization and mapping (SLAM). SLAM refers to the process of using images to determine the position of objections in the environment while also constructing a representation of the imaged environment. Visual SLAM techniques include detecting and tracking certain features in images such as edges, textures, room corners, window corners, door corners, faces, sidewalk edges, street edges, building edges, tree trunks, and other prominent features. Control circuitry 704 may rely entirely upon image sensors 744 to perform simultaneous localization and mapping, or control circuitry 704 may synthesize image data with range data from one or more distance sensors (e.g., light-based proximity sensors). If desired, control circuitry 704 may use display to display a visual representation of the mapped environment.

Input-output devices may include sensors 746, e.g., motion sensors. Sensors 746 may include one or more accelerometers (e.g., accelerometers that measure acceleration along one, two, or three axes), gyroscopes, barometers, magnetic sensors (e.g., compasses), image sensors (e.g., image sensor 744) and other sensor structures. Sensors 746 may, for example, include one or more microelectromechanical systems (MEMS) sensors (e.g., accelerometers, gyroscopes, microphones, force sensors, pressure sensors, capacitive sensors, or any other suitable type of sensor formed using microelectromechanical systems technology).

Control circuitry 704 may be used to store and process motion sensor data. If desired, motion sensors, processing circuitry, and storage that form motion sensor circuitry may form part of a system-on-chip integrated circuit (as an example).

Input-output devices may include movement generation circuitry. Movement generation circuitry may receive control signals from control circuitry 704. Movement generation circuitry may include electromechanical actuator circuitry that, when driven, moves device 700 in one or more directions. For example, movement generation circuitry may laterally move device 700 and/or may rotate device 700 around one or more axes of rotation. Movement generation circuitry may, for example, include one or more actuators formed at one or more locations of device 700. When driven by a motion control signal, actuators may move (e.g., vibrate, pulse, tilt, push, pull, rotate, etc.) to cause device 700 to move or rotate in one or more directions. The movement may be slight (e.g., not noticeable or barely noticeable to a user of device 700), or the movement may be substantial. Actuators may be based on one or more vibrators, motors, solenoids, piezoelectric actuators, speaker coils, or any other desired device capable of mechanically (physically) moving device 700.

Some or all of movement generation circuitry such as actuators may be used to perform operations that are unrelated to rotation of device 700. For example, actuators may include vibrators that are actuated to issue a haptic alert or notification to a user of device 700. Such alerts may include, for example, a received text message alert identifying that device 700 has received a text message, a received telephone call alert, a received email alert, an alarm notification alert, a calendar notification alert, or any other desired notification. By actuating actuator, device 700 may inform the user of any desired device condition.

Motion sensor circuitry may sense motion of device 700 that is generated by movement generation circuitry. If desired, motion sensor circuitry may provide feedback signals associated with the sensed motion of device 700 to movement generation circuitry. Movement generation circuitry may use the feedback signals to control actuation of the movement generation circuitry.

Control circuitry 704 may use motion sensor circuitry and/or movement generation circuitry to determine the angle of arrival of wireless signals received by device 700 from another electronic device. For example, control circuitry 704 may use movement generation circuitry to move device 700 from one position to another. Motion sensor circuitry may be used to track the movement of device 700 as it is moved between the different positions. At each position, control circuitry 704 may receive wireless signals from another electronic device. Control circuitry 704 may process the received wireless signals together with the motion data from motion sensor circuitry to more accurately determine the position of the other electronic device. The use of motion generation circuitry is merely illustrative, however. If desired, motion sensor circuitry may track movement of device 700 that is not caused by motion generation circuitry. This may include a user's natural, unprompted movement of device 700 and/or the user's movement of device 700 after the user is prompted (by display, audio circuitry 710, a haptic output device in device 700, or any other suitable output device) to move device 700 in a particular fashion.

Other sensors that may be included in input-output devices include ambient light sensors for gathering information on ambient light levels, proximity sensor components (e.g., light-based proximity sensors, capacitive proximity sensors, and/or proximity sensors based on other structures), depth sensors (e.g., structured light depth sensors that emit beams of light in a grid, a random dot array, or other pattern, and that have image sensors that generate depth maps based on the resulting spots of light produced on target objects), sensors that gather three-dimensional depth information using a pair of stereoscopic image sensors, LIDAR (light detection and ranging) sensors, radar sensors, and other suitable sensors.

Input-output circuitry may include wireless communications circuitry for communicating wirelessly with external equipment. Wireless communications circuitry may include radio frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 708 may include radio-frequency transceiver circuitry for handling various radio-frequency communications bands. For example, wireless circuitry 708 may include transceiver circuitry.

Transceiver circuitry may be wireless local area network transceiver circuitry. Transceiver circuitry may handle 2.4 GHz and 5 GHz bands for Wi-Fi® (IEEE 802.11) communications and may handle the 2.4 GHz Bluetooth® communications band.

Circuitry may use cellular telephone transceiver circuitry for handling wireless communications in frequency ranges such as a communications band from 700 to 960 MHz, a band from 1710 to 2170 MHz, a band from 2300 to 2700 MHz, other bands between 700 and 2700 MHz, higher bands such as LTE bands 42 and 43 (3.4-3.6 GHz), or other cellular telephone communications bands. Circuitry may handle voice data and non-voice data.

Millimeter wave transceiver circuitry (sometimes referred to as extremely high frequency transceiver circuitry) may support communications at extremely high frequencies (e.g., millimeter wave frequencies such as extremely high frequencies of 7 GHz to 400 GHz or other millimeter wave frequencies). For example, circuitry may support IEEE 802.11ad communications at 60 GHz. Circuitry may be formed from one or more integrated circuits (e.g., multiple integrated circuits mounted on a common printed circuit in a system-in-package device, one or more integrated circuits mounted on different substrates, etc.).

Ultra-wideband transceiver circuitry may support communications using the IEEE 802.15.4 protocol and/or other wireless communications protocols. Ultra-wideband wireless signals may be characterized by bandwidths greater than 500 MHz or bandwidths exceeding 20% of the center frequency of radiation. The presence of lower frequencies in the baseband may allow ultra-wideband signals to penetrate through objects such as walls. Transceiver circuitry may operate in a 2.4 GHz frequency band, a 6.5 GHz frequency band, an 8 GHz frequency band, and/or at other suitable frequencies.

Wireless communications circuitry may include satellite navigation system circuitry such as Global Positioning System (GPS) receiver circuitry for receiving GPS signals at 1575 MHz or for handling other satellite positioning data (e.g., GLONASS signals at 1609 MHz). Satellite navigation system signals for receiver are received from a constellation of satellites orbiting the earth.

In satellite navigation system links, cellular telephone links, and other long-range links, wireless signals are typically used to convey data over thousands of feet or miles. In Wi-Fi® and Bluetooth® links at 2.4 and 5 GHz and other short-range wireless links, wireless signals are typically used to convey data over tens or hundreds of feet. Extremely high frequency (EHF) wireless transceiver circuitry may convey signals over these short distances that travel between transmitter and receiver over a line-of-sight path. To enhance signal reception for millimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of device 700 can be switched out of use and higher-performing antennas used in their place.

Wireless communications circuitry can include circuitry for other short-range and long-range wireless links if desired. For example, wireless communications circuitry 36 may include circuitry for receiving television and radio signals, paging system transceivers, near field communications (NFC) circuitry, etc.

The one or more applications 734 on device 700 can include any applications installed on the device 700, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or advanced audio codec (AAC) files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations, and the like) on a display surface. In another example, a timer module can be a software timer. The timer module can also be implemented in hardware. The time module can maintain various timers for any number of events.

I/O subsystem 706 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 706 can include a display and user input devices such as a keyboard, mouse, and/or trackpad. In some embodiments, I/O subsystem 706 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 702) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 706 can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 700 can include a touchpad (not shown) for activating or deactivating particular functions. In some embodiments, the touchpad is a touch-sensitive area of the device 700 that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmitting devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering, sharing, and use of data available from specific and legitimate sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate another device, and vice versa to control which devices ranging operations may be performed. Further, other uses for personal information data that benefit the user are also contemplated by the present disclosure. For instance, health and fitness data may be shared to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing content and performing ranging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Although the present disclosure has been described with respect to specific embodiments, it will be appreciated that the disclosure is intended to cover all modifications and equivalents within the scope of the following claims.

All patents, patent applications, publications, and descriptions mentioned herein are incorporated by reference in their entirety for all purposes. None is admitted to be prior art.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of all examples, or exemplary language (e.g., "such as") provided herein, is intended merely to better illuminate embodiments of the disclosure and does not pose a limitation on the scope of the disclosure unless otherwise claimed.

No language in the specification should be construed as indicating any non-claimed element as essential to the practice of the disclosure. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmitting devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive or an entire computer system), and may be present on or within different computer program products within a system or network. A computer system may include a monitor, printer, or other suitable display for providing any of the results mentioned herein to a user.

The specific details of particular embodiments may be combined in any suitable manner or varied from those shown and described herein without departing from the spirit and scope of embodiments of the invention.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

All publications, patents, and patent applications cited herein are hereby incorporated by reference in their entirety for all purposes.

What is claimed is:

1. A method comprising performing on an electronic device comprising circuit engines configured to evaluate a particular type of machine learning model:
   receiving, at a first system routine from a first client application, a provisioning request indicating that the first client application includes first code for evaluating the particular type of machine learning model, wherein the first system routine executes in user space of memory on the electronic device;
   provisioning the first code for execution on one or more of the circuit engines;
   receiving, at a second system routine, an inference request from the first client application for evaluating the particular type of machine learning model, the inference request including first input data upon which the particular type of machine learning model is evaluated, wherein the second system routine executes in kernel space of memory on the electronic device;
   receiving, at the second system routine, information about a current status and a historical performance of the circuit engines;
   assigning, by the second system routine, the inference request to one or more of the circuit engines based on the information;
   evaluating, using the one or more of the circuit engines, the inference request; and
   providing a result of the inference request to the first client application.

2. The method of claim 1, further comprising:
   receiving, at the first system routine from one or more second client applications, one or more additional provisioning requests;
   provisioning additional code of the one or more second client applications for execution on the circuit engines;
   receiving, at the second system routine, additional inference requests for evaluating the particular type of machine learning model; and
   assigning the additional inference requests to the circuit engines based on the current status and the historical performance of the circuit engines.

3. The method of claim 1, wherein the inference request is received from the first client application, bypassing the first system routine.

4. The method of claim 1, wherein assigning the inference request is based on a priority for the inference request, and wherein the priority is based on a property of the first client application.

5. The method of claim 1, wherein assigning the inference request is further based on a hint provided by a performance control routine running in kernel space, the hint identifying other hardware resources that are being used.

6. The method of claim 1, wherein assigning the inference request is further based on a hint provided by the first client application for evaluating multiple inference requests simultaneously on the circuit engines.

7. The method of claim 1, wherein provisioning the first code for execution on the one or more of the circuit engines includes dividing the first code into two or more segments.

8. The method of claim 1, wherein provisioning the first code for execution on the one or more of the circuit engines includes compiling the first code using a compiler specific to the particular type of machine learning model that the circuit engines evaluate.

9. The method of claim 1, wherein evaluating the inference request includes providing, by the second system routine, the inference request to a circuit interface dedicated to an assigned circuit engine.

10. The method of claim 1, wherein the result of the inference request is provided to the first client application via a private link that bypasses the first system routine and the second system routine.

11. The method of claim 1, wherein the particular type of machine learning model is a neural network.

12. A non-transitory computer-readable medium storing a set of instructions that, when executed, cause an electronic device having circuit engines, configured to evaluate a particular type of machine learning model, to perform a method comprising:
    receiving, at a first system routine from a first client application, a provisioning request indicating that the first client application includes first code for evaluating the particular type of machine learning model, wherein the first system routine executes in user space of memory on the electronic device;
    provisioning the first code for execution on one or more of the circuit engines;
    receiving, at a second system routine, an inference request from the first client application for evaluating the particular type of machine learning model, the inference request including first input data upon which the particular type of machine learning model is evaluated, wherein the second system routine executes in kernel space of memory on the electronic device;
    receiving, at the second system routine, information about a current status and a historical performance of the circuit engines;
    assigning, by the second system routine, the inference request to one or more of the circuit engines based on the information;
    evaluating, using the one or more of the circuit engines, the inference request; and
    providing a result of the inference request to the first client application.

13. The non-transitory computer-readable medium of claim 12, further comprising:
    receiving, at the first system routine from one or more second client applications, one or more additional provisioning requests;
    provisioning additional code of the one or more second client applications for execution on the circuit engines;
    receiving, at the second system routine, additional inference requests for evaluating the particular type of machine learning model; and
    assigning the additional inference requests to the circuit engines based on the current status and the historical performance of the circuit engines.

14. The non-transitory computer-readable medium of claim 12, wherein the inference request is received from the first client application, bypassing the first system routine.

15. The non-transitory computer-readable medium of claim 12, wherein the result of the inference request is provided to the first client application via a private link that bypasses the first system routine and the second system routine.

16. An electronic device comprising:
    circuit engines configured to evaluate a particular type of machine learning model;
    a memory storing a plurality of instructions; and
    one or more processors communicably coupled with the memory, wherein the one or more processors are configured to execute the plurality of instructions to perform:
        receiving, at a first system routine from a first client application, a provisioning request indicating that the first client application includes first code for evaluating the particular type of machine learning model, wherein the first system routine executes in user space of memory on the electronic device;
        provisioning the first code for execution on one or more of the circuit engines;
        receiving, at a second system routine, an inference request from the first client application for evaluating the particular type of machine learning model, the inference request including first input data upon which the particular type of machine learning model is evaluated, wherein the second system routine executes in kernel space of memory on the electronic device;
        receiving, at the second system routine, information about a current status and a historical performance of the circuit engines;
        assigning, by the second system routine, the inference request to one or more of the circuit engines based on the information;
        evaluating, using the one or more of the circuit engines, the inference request; and
        providing a result of the inference request to the first client application.

17. The electronic device of claim 16, further comprising:
    receiving, at the first system routine from one or more second client applications, one or more additional provisioning requests;
    provisioning additional code of the one or more second client applications for execution on the circuit engines;
    receiving, at the second system routine, additional inference requests for evaluating the particular type of machine learning model; and
    assigning the additional inference requests to the circuit engines based on the current status and the historical performance of the circuit engines.

18. The electronic device of claim 16, wherein the inference request is received from the first client application, bypassing the first system routine.

19. The electronic device of claim 16, wherein assigning the inference request is further based on a hint provided by a performance control routine running in kernel space, the hint identifying other hardware resources that are being used.

20. The electronic device of claim 16, wherein the result of the inference request is provided to the first client application via a private link that bypasses the first system routine and the second system routine.

* * * * *